United States Patent
Schoinas

(10) Patent No.: US 6,662,276 B2
(45) Date of Patent: Dec. 9, 2003

(54) STORING DIRECTORY INFORMATION FOR NON UNIFORM MEMORY ARCHITECTURE SYSTEMS USING PROCESSOR CACHE

(75) Inventor: Ioannis T. Schoinas, Portland, OR (US)

(73) Assignee: Intel Corporation, Santa Clara, CA (US)

(*) Notice: Subject to any disclaimer, the term of this patent is extended or adjusted under 35 U.S.C. 154(b) by 352 days.

(21) Appl. No.: 09/751,579

(22) Filed: Dec. 29, 2000

(65) Prior Publication Data

US 2002/0087778 A1 Jul. 4, 2002

(51) Int. Cl.⁷ .............................................. G06F 12/00
(52) U.S. Cl. ........................ 711/145; 711/144; 711/156
(58) Field of Search .................................. 711/120, 122, 711/144, 145, 156

(56) References Cited

U.S. PATENT DOCUMENTS 5,893,144 A  *  4/1999  Wood et al. ................. 211/122
5,926,829 A  *  7/1999  Hagersten et al. ........... 711/120
6,275,900 B1 *  8/2001  Liberty ........................ 711/120

* cited by examiner

Primary Examiner—Jack A. Lane
(74) Attorney, Agent, or Firm—Blakely, Sokoloff, Taylor & Zafman LLP

(57) ABSTRACT

An embodiment of the present invention includes a cache and a controller in a non uniform memory architecture (NUMA) system. The cache stores a plurality of entries, each of which contains an entry type indicating if the entry is one of a normal entry and a directory entry. The controller processes an access request from a processor for a memory block using the plurality of entries.

30 Claims, 10 Drawing Sheets

US 6,662,276 B2

STORING DIRECTORY INFORMATION FOR NON UNIFORM MEMORY ARCHITECTURE SYSTEMS USING PROCESSOR CACHE

BACKGROUND

1. Field of the Invention

This invention relates to computer architecture. In particular, the invention relates to Non Uniform Memory Architecture (NUMA) systems.

2. Description of Related Art

Non Uniform Memory Architecture (NUMA) systems have been increasingly popular in recent years. A NUMA system typically consists of a number of nodes connected through interconnecting links and/or switches. Each node may have one or more processors and node memory as part of the system overall memory.

To maintain cache coherency, NUMA systems employ specialized cache coherency protocols. NUMA coherency protocols use hardware data structures called directories to keep track of the sharing information for each memory block. The sharing information for a block consists of the block caching state and the identity of the nodes that share this block. Typically, the directory is distributed among the NUMA nodes with each node being responsible for keeping track of the sharing information for the portion of the memory blocks located on the particular node.

The directory protocol is implemented by the directory controller. Nodes that wish to access a particular memory block must send a message to the directory controller in order to request permission to access the block. The directory controller performs all the necessary protocol actions to ensure that cache coherency is not violated in the system.

Previous NUMA systems have implemented directories in two ways: full and sparse directory systems. Full directory systems store the sharing information next to each block in main memory. A full directory wastes a significant amount of physical memory since a directory entry is required for each and every memory block in main memory even if the memory block is not cached anywhere in the system. Furthermore, accessing the main memory for each directory protocol action can adversely impact the performance of the directory protocol.

Sparse directory systems only store the sharing information for memory blocks currently cached in remote processors. In sparse directories, the amount of memory used to keep the sharing information is directly proportional to the number of memory blocks that can be stored in the cache of an individual processor. Existing implementation of sparse directory systems use separate random access memory (RAM) devices interfaced to the directory controller. This results in inefficient use of hardware and reduces performance.

BRIEF DESCRIPTION OF THE DRAWINGS

The features and advantages of the present invention will become apparent from the following detailed description of the present invention in which.

DESCRIPTION

An embodiment of the present invention includes a cache and a controller in a non uniform memory architecture (NUMA) system. The cache stores a plurality of entries, each of which contains an entry type indicating if the entry is one of a normal entry and a directory entry. The controller processes an access request from a processor for a memory block using the plurality of entries.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Figure 1:
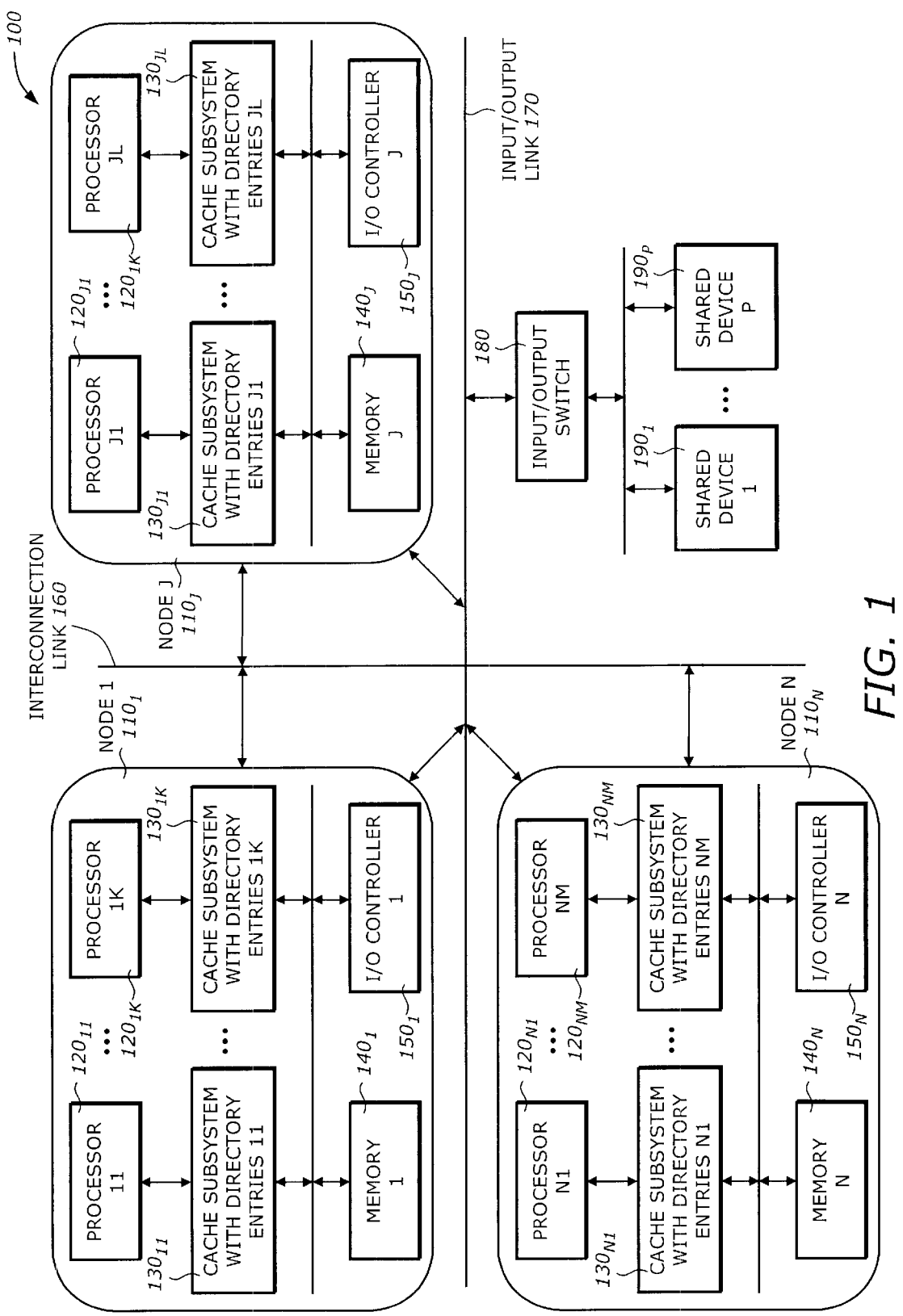
FIG. 1 is a diagram illustrating a system in which one embodiment of the invention can be practiced.

FIG. 1 is a diagram illustrating a system 100 in which one embodiment of the invention can be practiced. The system 100 represents a NUMA system including N nodes $110_1$ to $110_N$, an interconnection link 160, an input/output (I/O) link 170, an I/O switch 180, and P shared devices $190_1$ to $190_P$.

The nodes $110_1$ to $110_N$ are processing subsystems which communicate with one another via the interconnection link 160. A node may send and/or receive messages from another node. The nodes $110_1$ to $110_N$ also access shared devices $190_1$ to $190_P$ via the I/O link 170. For clarity, subscript references to the nodes and their elements will be dropped in the following description. For example, the node 110 can refer to any one of the nodes $110_1$ to $110_N$. The nodes $110_1$ to $110_N$ may be similar or different although FIG. 1 shows them with similar components.

The node 110 includes a number of processors, a number of cache subsystems having directory entries, common memory, and I/O controller. For example, node $110_J$ includes L processors $120_1$ to $120_J$, L cache subsystems with directory entries $130_{J1}$ to $130_{JL}$, a memory $140_J$, and an I/O controller $150_J$. For clarity, the subscripts for node components will be dropped in the following description. Each of the processors $120_1$ to $120_J$ represents a central processing unit of any type of architecture, such as complex instruction set computers (CISC), reduced instruction set computers (RISC), very long instruction word (VLIW), multi-threaded computers, or hybrid architecture. The processors $120_1$ to $120_J$ may be the same or different. Each of the L cache subsystems with directory entries $130_{J1}$ to $130_{JL}$ includes a cache memory, referred simply as cache, associated controllers, to control cache and memory accesses from the corresponding processor in node $110_J$ or the node processor in other nodes. In particular, the cache stores directory information with normal cache data and code. The memory $140_J$ is the main memory common to the L processors $120_1$ to $120_J$. The memory $140_J$ may be implemented by any appropriate memory technology including static random access memory (SRAM), dynamic random access memory (DRAM), flash memory, or any combination thereof. The I/O controller $150_J$ provides I/O operations and may be any appropriate I/O devices. Examples of I/O devices include mass storage devices (e.g., compact disk (CD) read only memory (ROM), floppy disks, hard disks, optical disks), communication devices (e.g., serial communication interface, network interface), graphics controllers, media controllers (e.g., audio, video), peripheral controllers (e.g., input devices, mice, tablet digitizers). In particular, the I/O device $150_J$ provides interface to the I/O link 170 so that processors in different nodes may have access to shared devices $190_1$ to $190_P$. In addition, any one of the L processors $120_1$ to $120_J$ may communicate with any one of the processors in other nodes via the interconnection link 160. In particular, a NUMA system also allows a processor in one node to access cache or memory in another node.

The communication among the nodes may involve memory access requests. A node that generates an access request to another node is referred to as a requesting node. A node receives the access request and processes the request using the cache subsystem is referred to a home node. A node that has a copy of the requested memory block is referred to as an owner node. A typical scenario may be as follows.

Suppose node $110_1$, $110_J$, and $110_N$ are requesting node, home node, and owner node, respectively. Node $110_1$ sends a request for exclusive access to a memory block in the home node $110_J$. Home node $110_J$ receives the remote access request and processes the request. If the directory is present but the state is dirty, i.e., the owner node $110_N$ that has a copy of the memory block has modified the memory block, the home node $110_J$ forwards the access request to the owner node $110_N$. The owner node $110_N$ responds to the request by sending the requested data block to the home node $110_J$. Upon receiving the data block from the owner node $110_N$, the home node $110_J$ updates its directory contents including the state of the corresponding directory. Then, the home node $110_J$ forwards the requested memory block to the requesting node $110_1$.

Figure 2:
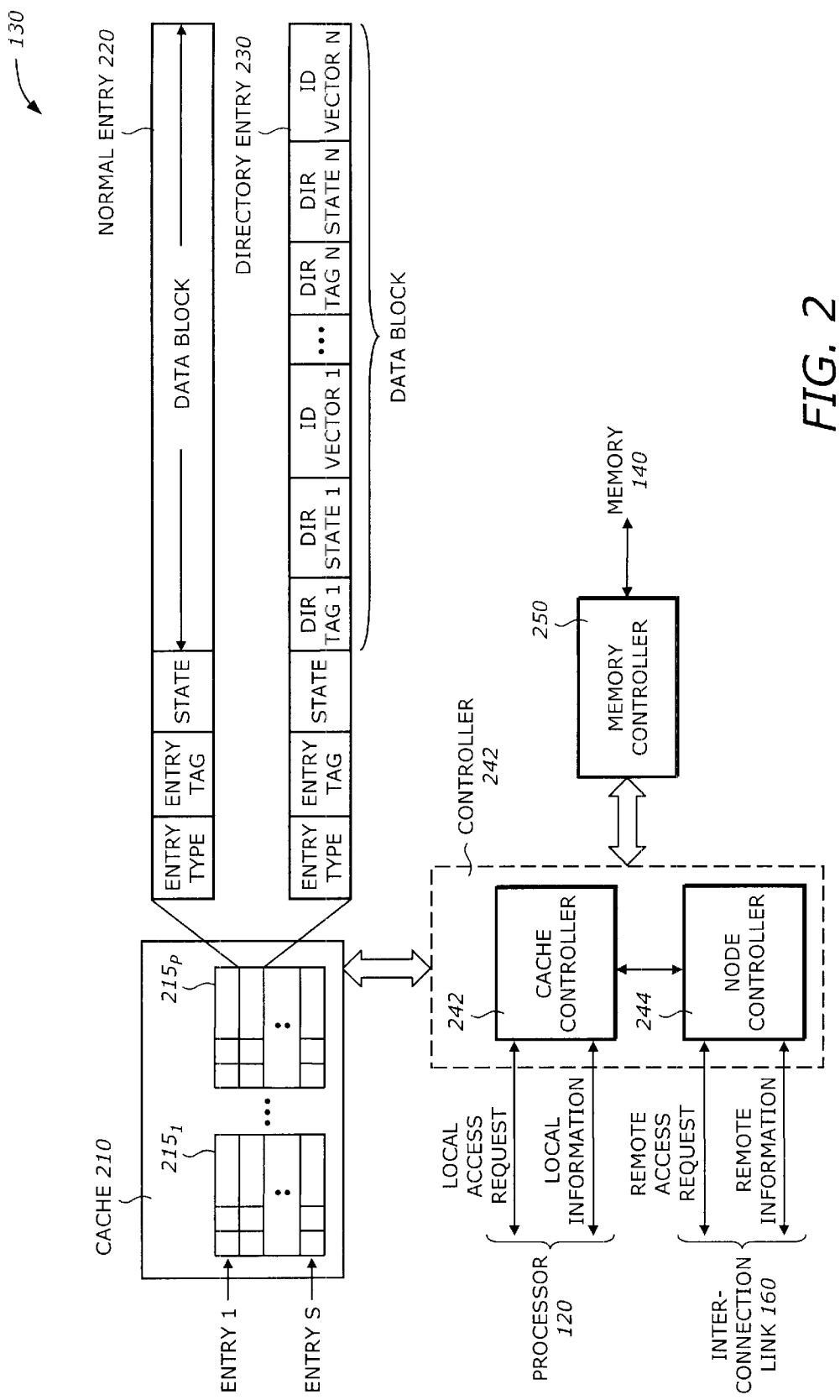
FIG. 2 is a diagram illustrating a cache subsystem shown in FIG. 1 according to one embodiment of the invention.

FIG. 2 is a diagram illustrating the cache subsystem 130 shown in FIG. 1 according to one embodiment of the invention. The cache subsystem 130 includes a cache 210, a controller 240, and a memory controller 250.

The cache 210 is a cache memory (e.g., fast SRAM) to provide fast access. Typically the cache 210 is an external to the processor in the node. In one embodiment, the cache 210 is a level-2 (L2) cache. The cache 210 stores a plurality of entries. Each of the plurality of entries contains an entry type indicating if the entry is one of a normal entry and a directory entry. The cache 210 may be organized and mapped in any appropriate manner, such as direct mapping, set associative mapping, or fully associative mapping. In one embodiment, the cache 210 is organized in an L-way set associative mapping, where L may be 2, 4, 8, or 16. As shown in FIG. 2, the cache 210 has P sets $215_1$ to $215_P$. Each set may have S entries indexed by an index. A cache entry may be a normal entry 220 or a directory entry 230.

The normal entry 220 stores normal cache information (e.g., data, code). The normal entry 220 has a number of fields: an entry type field, a tag field, a state field, and a data field. The entry type field contains a value to indicate the type of the entry (e.g., normal, directory). The tag field contains the tag value for the corresponding memory block in the data field. The state field contains a state value indicating the state of the corresponding memory block. The state of the memory block is typically used by a cache coherence protocol to maintain cache coherency. An example of a cache coherence protocol may be the modified, exclusive, shared, and invalid (MESI) protocol. The data field contains the memory block corresponding to the index and the tag values. The memory block may contain data or code used by the processor. The size of the data field depends on the size of the block or line in the cache protocol. For example, a block size of 128-byte results in a data field of 1024-bit.

The directory entry 230 stores directory information. Directory information provides information on how to access or where to locate the corresponding memory block. Since directory information is much less than the data block, using the data field in a normal entry to store directory information results in efficient use of cache. In other words, the memory space for the data field in the normal entry 230 may store many items of directory information. The directory entry 230 has a number of fields: an entry type field, an entry tag field, a state field, and a data block field. The data block field includes N directory descriptors for N directories. Each descriptor contains a directory tag field, a directory state field, and an identifier vector field. The entry type field in the directory entry 230 is the same as that in the normal field 220, i.e., it is used to indicate the type of the entry. The directory tag field contains the tag for the corresponding memory block. The directory state field contains the state of the corresponding memory block. As in the state of the normal field 220, the state is used typically in a cache coherence protocol. The identifier vector field contains identification of the node or nodes that have a copy of the corresponding memory block. There are a number of ways to encode the identifier vector field. One way is to pre-assign the node identifier according to the bit position in the field, and use a bit to indicate if the node has a copy of the memory block. For example, a zero bit indicates that the node does not have a copy and a one bit indicates that the node has a copy. Suppose there are 16 nodes in the system. Then the identifier vector field has 16 bits from bit 0 to bit 15. Bit 0 corresponds to node 0, bit 1 corresponds to node 1, etc. As an example, if nodes 0, 5, 11, and 13 have a copy of the memory block, then the identifier vector field may contain the bit pattern 0 0 1 0 1 0 0 0 0 0 1 0 0 0 0 1. A node that has a copy of the memory block is referred to as an owner node.

The cache 210 stores both directory entries and normal entries. The directory entries may also be additionally stored in the memory 140 (FIG. 1). In this case, the full directory of all the memory blocks may be stored. The advantages of using the memory 140 to store additional directory entries include simplification of directory protocol because there is no need to have a back-invalidation process to evict cache blocks when the cache is full.

In order to allow both directory and normal type entries to be stored in the processor cache, a mechanism is used to differentiate among them at time of entry retrieval. If the directory entries are stored in main memory, the directory entry field is used as part of the tag when an entry is retrieved from the cache. If the directory entries are not stored in main memory, instead of an explicit entry type field, it is preferable to allocate one or more special entry tags for directory entries. For example, if the tag size is 4 bits, the directory entry tags may have a fixed binary value 1000 while the normal entry tags can have any of the value 0XXX (X=0 or 1). Using only one special tag ensures that directory entries do not occupy more than one set in the processor cache. Alternatively, if it is desired to allow directory entries to potentially occupy more than set in the processor cache, two or more special tags may be used. For example, if the directory entries occupy two sets in the processor cache, then directory entry tags can have the binary values 100X while normal entry tags can have any of the value 0XXX where X is 0 or 1.

The cache 210 is controlled by the controller 240 for access, updating, and cache coherency maintenance. The use and control of the cache 210 includes typical processes such as cache replacement, cache write back and write through, cache eviction, block (or line) fill, etc. These processes are well known in the art and will not be discussed further.

The controller 240 processes an access request for a memory block using the cache entries in the cache 210. The access request comes from a processor in the system 100 (FIG. 1). This processor may be any processor in the system, including the processor in the same node of the cache 210. For example, with respect to the cache subsystem $130_{J1}$ shown in FIG. 1, the processor requesting the access may be the processor $120_{J1}$, processor $120_{Jk}$, processor $120_{1k}$, or processor $120_{N1}$, etc. As discussed before, a processor outside the node requests an access via the interconnection link 160. The controller 240 includes a cache controller 242 and a node controller 244. In the following, each of the controllers may be described to have specific components or functions; however, these components or functions are not necessarily exclusive to any of the controllers. A component or function may be implemented in either the cache controller 242 or the node controller 244.

The memory controller 250 interfaces between the memory 140 (FIG. 1) and the controller 240. The memory controller 250 may have control circuitry for memory accesses such as DRAM controller, arbitration logic, refresh circuitry, buffered write, block fill, burst transfers, etc.

Figure 3:
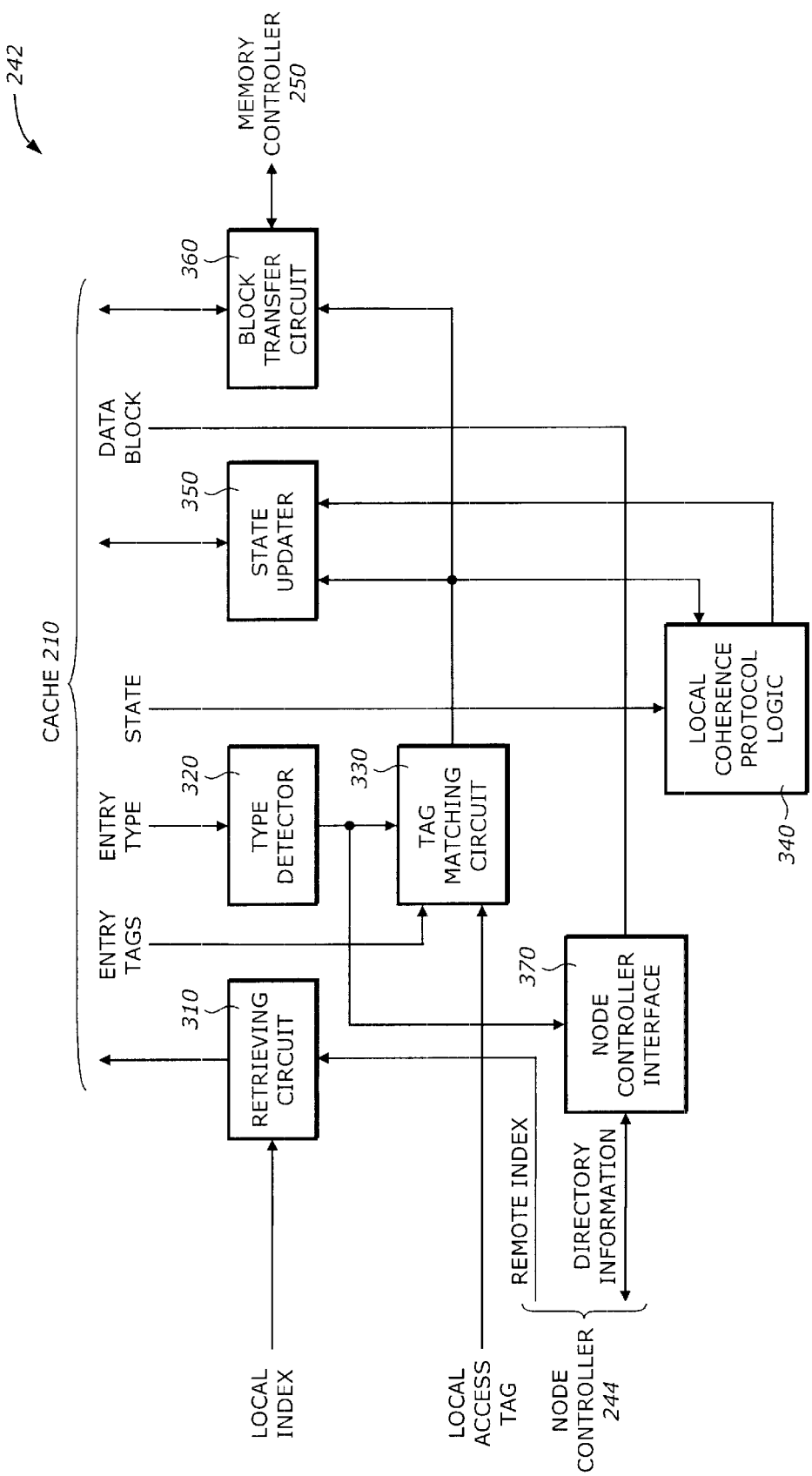
FIG. 3 is a diagram illustrating a cache controller shown in FIG. 2 according to one embodiment of the invention.

FIG. 3 is a diagram illustrating the cache controller 242 shown in FIG. 2 according to one embodiment of the invention. The cache controller 242 includes a retrieving circuit 310, a type detector 320, a tag matching circuit 330, a local cache coherence protocol logic 340, a state updater 350, a block transfer circuit 360, and a node controller interface 370. The cache controller 242 receives the access request. The access request typically consists of the address of the memory. The access request includes a local index, a local access tag, and a local block offset.

The retrieving circuit 310 retrieves the entry in the cache 210 (FIG. 2) based on the index of the access request. The access request may be provided directly or through the node controller 244. The index of the access request is used to address, or look up the row of the cache 210 as shown in FIG. 2. The cache 210 returns the tags of the entry corresponding to the index for matching or comparison to determine if the memory block containing the requested memory location is in the cache.

The type detector 320 detects the entry type to determine if the retrieved entry is a normal entry or a directory entry. If the entry is a normal entry, the cache controller 242 goes through the normal process of cache operations for a normal cache access. If the entry is a directory entry, the cache controller 242 goes through a directory process to locate the memory block. In one embodiment, the directory process is delegated to the node controller 244 although this process can also be performed within the cache controller 242, especially for a local access requested by a processor within the node containing the underlying cache subsystem.

The tag matching circuit 330 matches an entry tag in the retrieved entry with the access tag to determine if the memory block is in the cache 210. If there is a match, a cache hit is declared and the access is allowed to the corresponding data block. If there is no match, a cache miss is declared and an appropriate memory block transfer is performed according to the cache protocol.

The local coherence protocol logic 340 contains logic circuit to keep track of the state of the memory block and to perform necessary operations to maintain the cache coherency. Since cache coherency should be maintained within a node and between nodes, the local coherence protocol logic 340 may operate in conjunction with the cache coherence protocol logic in the node controller 244. In other words, this function may be either exclusively implemented in the cache controller 242, exclusively implemented in the node controller 244, or shared between the cache controller 242 and the node controller 244.

The state updater 350 updates the state of the retrieved entry according to the cache coherence protocol provided by the local coherence protocol logic 340. The state updater 350 may include a write circuit to write to the state field of the retrieved entry. The block transfer circuit 360 performs a memory block transfer from the memory to the cache 210 when there is a miss, or from the cache 210 to the memory for a cache write-back or write through.

The node controller interface 370 provides directory information retrieved from the cache 210 to the node controller 244 when the entry type is a directory type. As discussed above, the cache controller 242 may have circuit to process directory entries directly.

Figure 4:
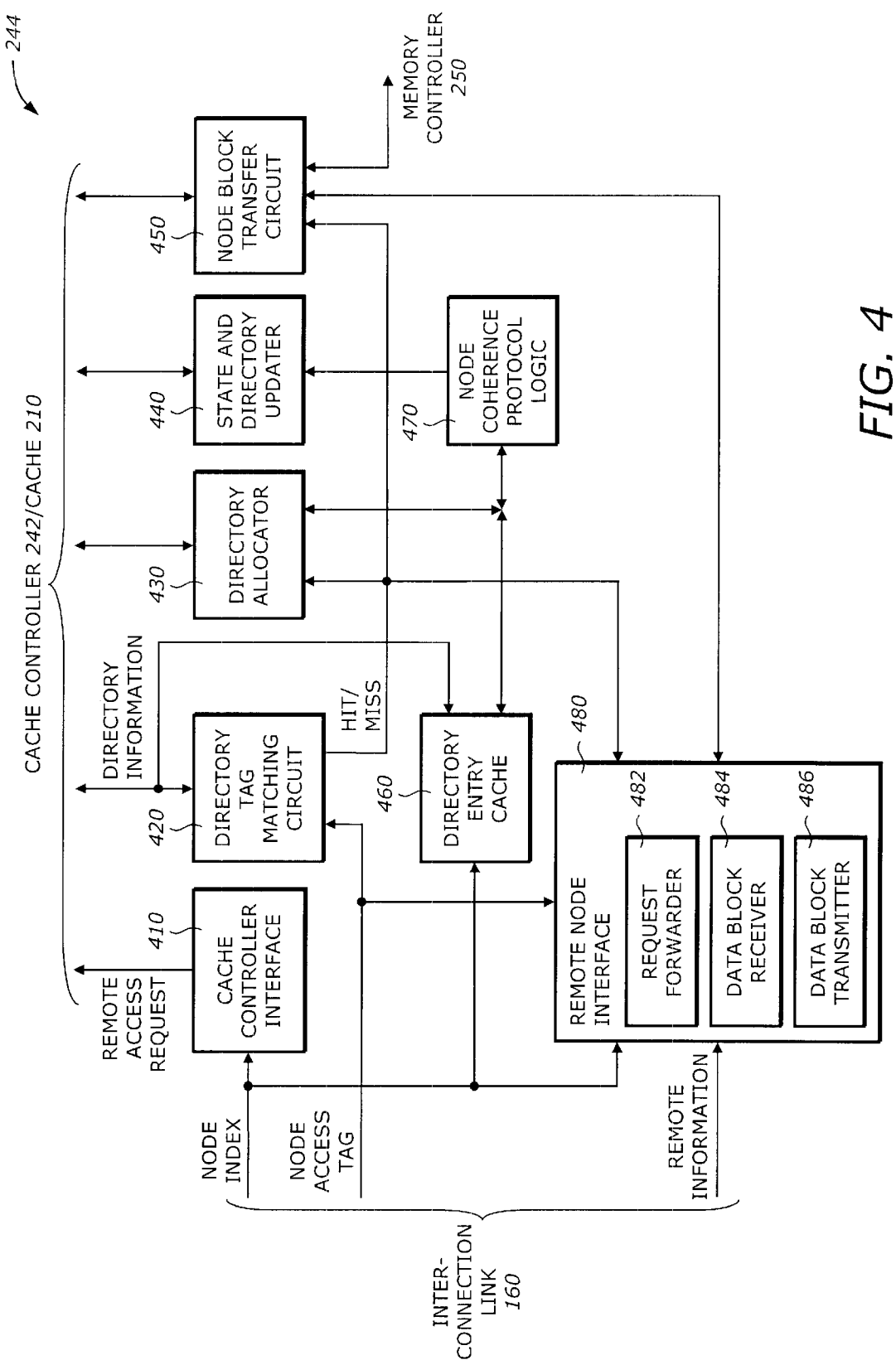
FIG. 4 is a diagram illustrating a node controller shown in FIG. 2 according to one embodiment of the invention.

FIG. 4 is a diagram illustrating the node controller 244 shown in FIG. 2 according to one embodiment of the invention. The node controller 244 includes a cache controller interface 410, a directory tag matching circuit 420, a directory allocator 430, a directory entry cache 440, a node coherence protocol logic 450, a state and directory updater 460, a node block transfer circuit 470, and a remote node interface 480. As discussed above, not all of these components are used exclusively in the node controller 244. Some of them may be more conveniently performed in the cache controller 242. Furthermore, not all of these components are needed. The node controller 244 receives a node access request via the interconnection link 160 (FIG. 1) from a remote node in the system 100. The node access information may include a node index and a node access tag. The node access information may also include other information such as the block offset and the node identifier identifying the requesting node.

The cache controller interface 410 provides the node access information from the remote node to the cache controller 244 (FIG. 2). The cache controller 210 returns the retrieved entry, especially when the retrieved entry is a directory entry. When the retrieved entry is a directory entry, all the directory entry fields are passed from the cache controller 242 to the directory tag matching circuit 420 for matching or comparison.

The directory tag matching circuit 420 matches the directory tags from the directory information received from the cache controller 242 with the node access tag. The directory tag matching circuit 420 may include a number of comparators operating in parallel to compare the directory tags with the node access tag to determine if the memory block can be located through the directory information. If there is a match, or if the directory is found in the cache 210, a directory hit is declared and the access is allowed to the memory block pointed to by the directory information. If there is no match, or the directory is not found in the cache 210, a directory miss is declared and appropriate directory locating process is performed.

The directory allocator 430 allocates a directory entry in the cache when there is a miss and a directory fill is performed to fill the directory entry with the new directory information. The directory entry cache 440 is an optional small cache to store frequently accessed directory information. The node coherence logic circuit 450 maintains cache coherency according to a node coherence protocol. The node coherence logic circuit 450 may work in conjunction with the local coherence protocol logic 340 (FIG. 3) as discussed above. The directory updater 460 updates the directory entry in the cache 210 in accordance to the cache coherence protocol, including the state of the corresponding memory block.

The block transfer circuit 470 transfers a memory block from the memory 140 (FIG. 1) or data block received from a remote node to the cache if the access request results in a miss. The block transfer circuit 470 may also transfer a memory block from the cache 210 to the remote node according to the cache coherency protocol.

The remote node interface circuit 480 exchanges remote information between the home node and the remote node. The remote node interface circuit 480 includes a request forwarder 482, a data block receiver 484, and a data block transmitter 486. The request forwarder 482 forwards the remote access request to the owner node having the memory block. This operation normally takes place in the following scenario. A requesting node sends an access request to the home node. The home node processes the access request and finds out that the requested memory block is located in another node, an owner node. Therefore, the home node forwards the access request information to the owner node. The owner node then transfers the requested memory block to the home node. The home node then updates its directory information, performs the necessary write back either to its own memory or cache, and then forward the memory block to the requesting node. The data block receiver 484 receives the memory block sent from the owner node, as discussed in the above scenario. The data block transmitter 486 transmits the memory block to the requesting node. The transmitted data block may be the same as the received data block or from the memory or the cache of the home node.

Figure 5:
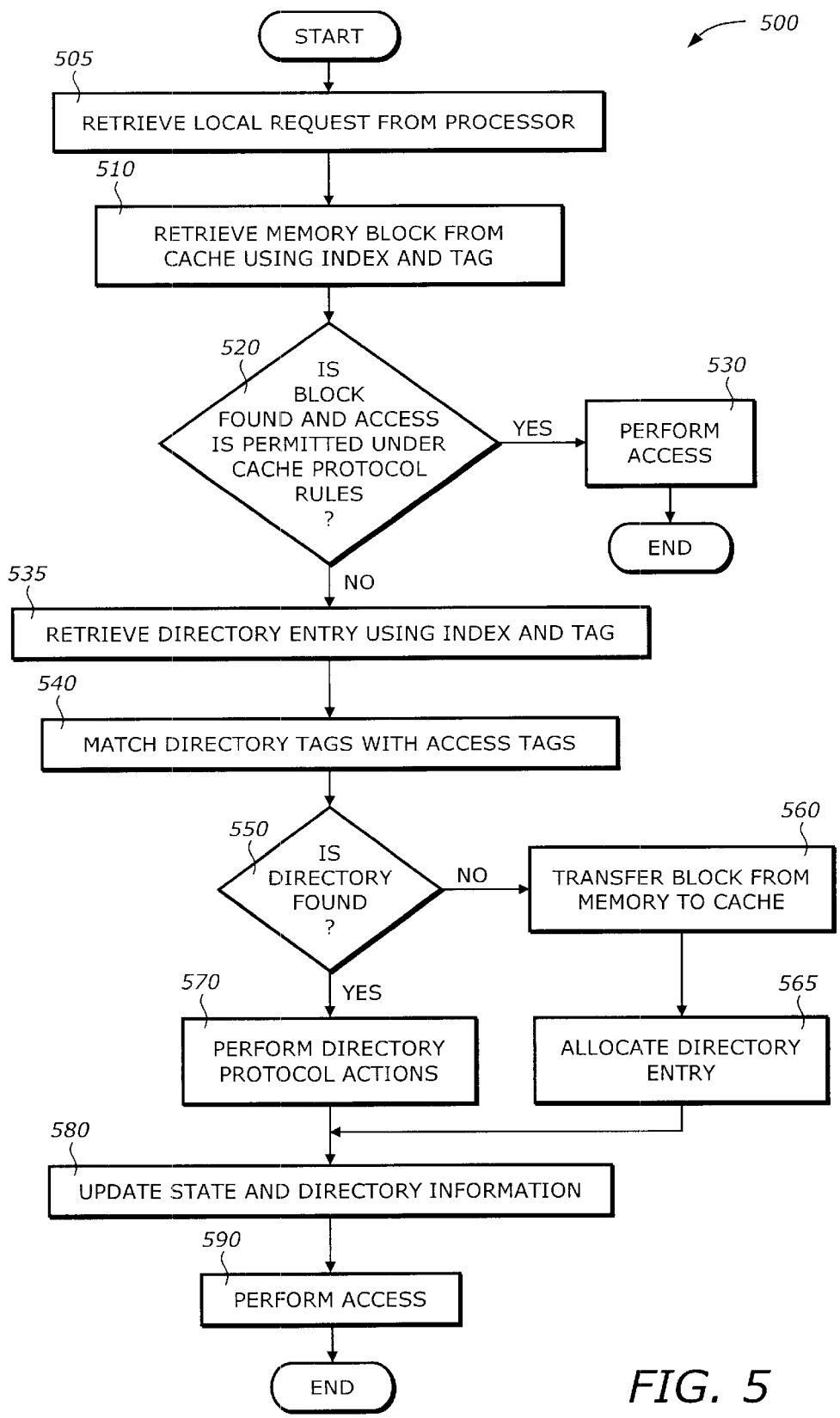
FIG. 5 is a flow chart illustrating a process for a local access according to one embodiment of the invention.

FIG. 5 is a flow chart illustrating a process 500 for a local access according to one embodiment of the invention.

Upon START, the process 500 receives a local access request from the local processor (Block 505). Then, the process 500 retrieves the memory block from the cache (Block 510). Typically, the index part of the access request information is used as a pointer to look up the entry in the cache. Next, the process 500 determines if the block is found and access is permitted under the cache protocol rules (Block 520). If so, the access is performed (Block 530) and the process is terminated. Otherwise, the process 500 searches and retrieves from the cache the directory block (Block 535). Then, it matches the tags in the directory entries with the access tag in the access request information (Block 540). Then, the process 500 determines if there is a match, i.e., if the directory is found in the cache (Block 550). If there is no match, or no directory entry is found, the process 500 transfers the memory block from memory to the cache (Block 560), allocates a new directory entry (Block 565) and goes to block 580. If there is a match, the process 500 performs the necessary protocol actions based on the directory coherence protocol (Block 570). Based on the access type and block state, this may include invalidations of remote copies and/or transfer of block data from memory. Next, the process 500 updates the state and directory information (Block 580). Finally, the process 500 allows the access to complete (Block 590) and is then terminated.

Figure 6:
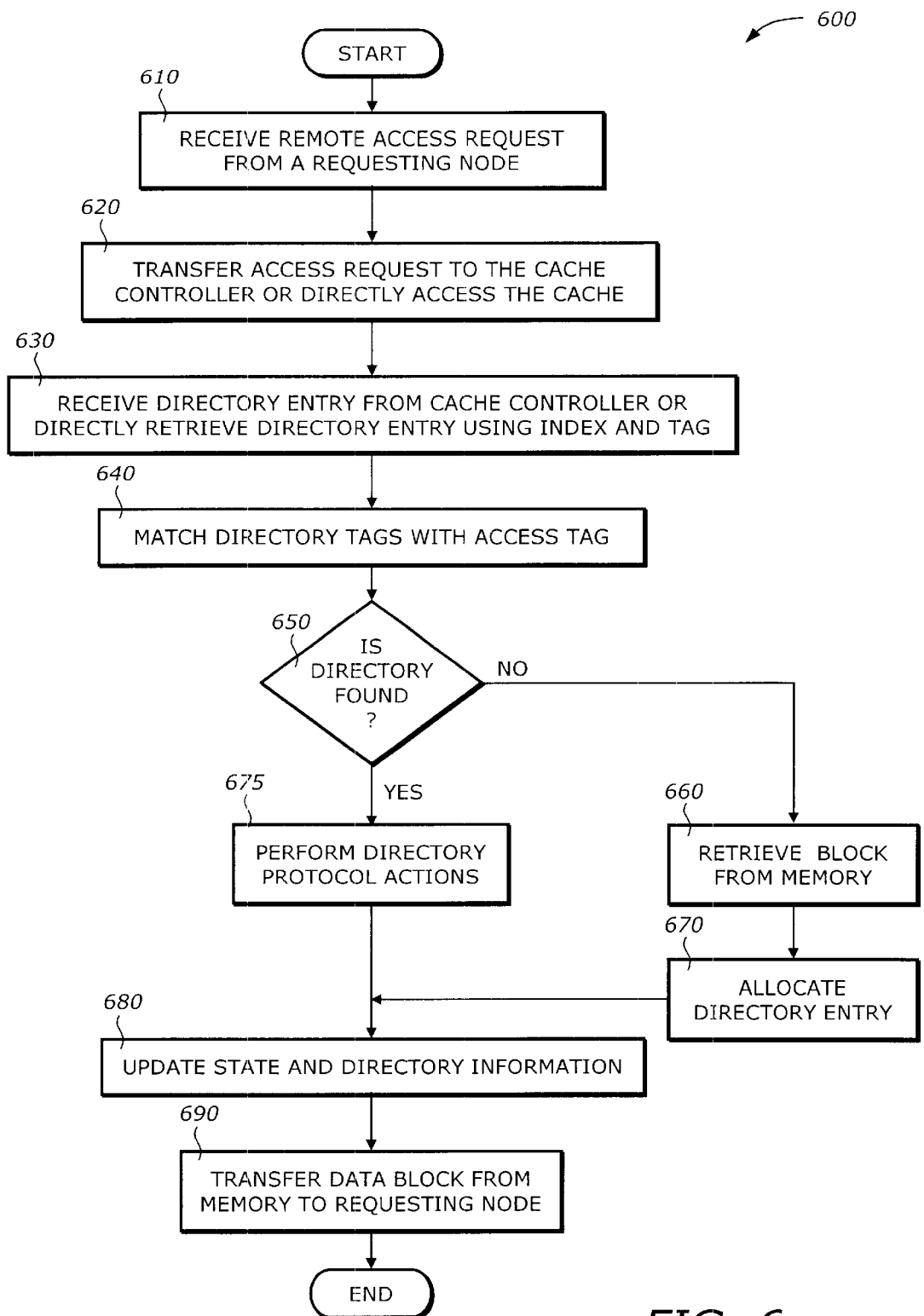
FIG. 6 is a flow chart illustrating a process for a remote access according to one embodiment of the invention.

FIG. 6 is a flow chart illustrating a process 600 for a remote access according to one embodiment of the invention.

Upon START, the process 600 receives a remote access request from a requesting node in the system (Block 610). Typically this remote access request is directed to the home node via the interconnection link. Then the process 600 transfers the access request information to the cache controller or directly retrieve the entry from the cache (Block 620). Next, the process 600 receives the directory information from the cache controller or directly from the cache (Block 630). Then, the process 600 matches the remote access tag with the directory tags in the directory entries (Block 640).

Next, the process 600 determines if there is a match, i.e., if the directory is found in the cache (Block 650). If not, the process 600 retrieves the memory block from memory (Block 660), allocates a new directory entry (Block 670) and goes to block 680. If there is a match, the process 600 performs the necessary protocol actions based on the directory coherence protocol (Block 675). Based on the access type and block state, this may include invalidations of remote copies and/or transfer of block data from memory. Next, the process 600 updates the state and directory information (Block 680). Finally, the process 600 sends the data block from memory to the requesting node (Block 690) and is then terminated.

Figure 7A:
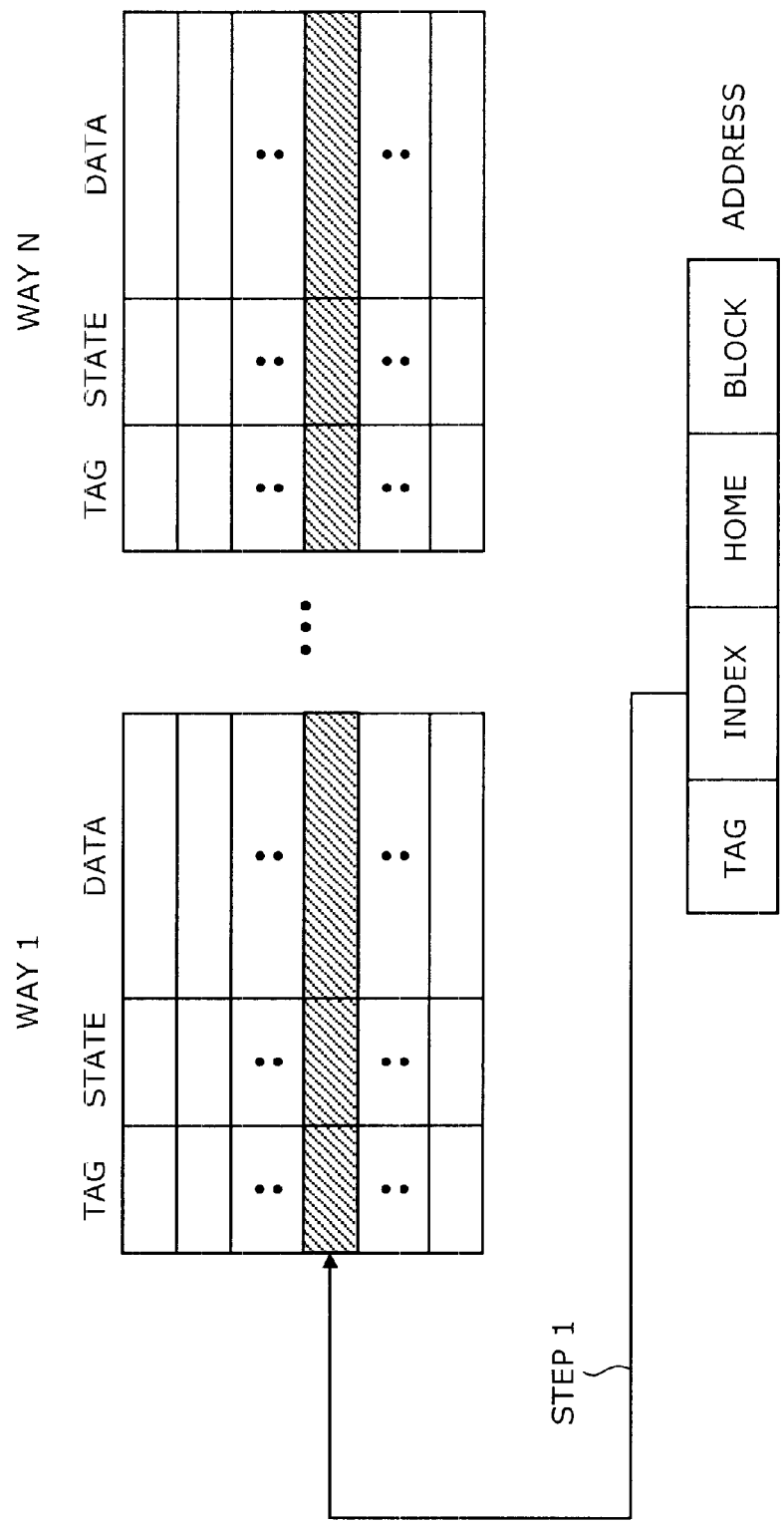
FIG. 7A is a diagram illustrating step 1 of a cache access according to one embodiment of the invention.
Figure 7B:
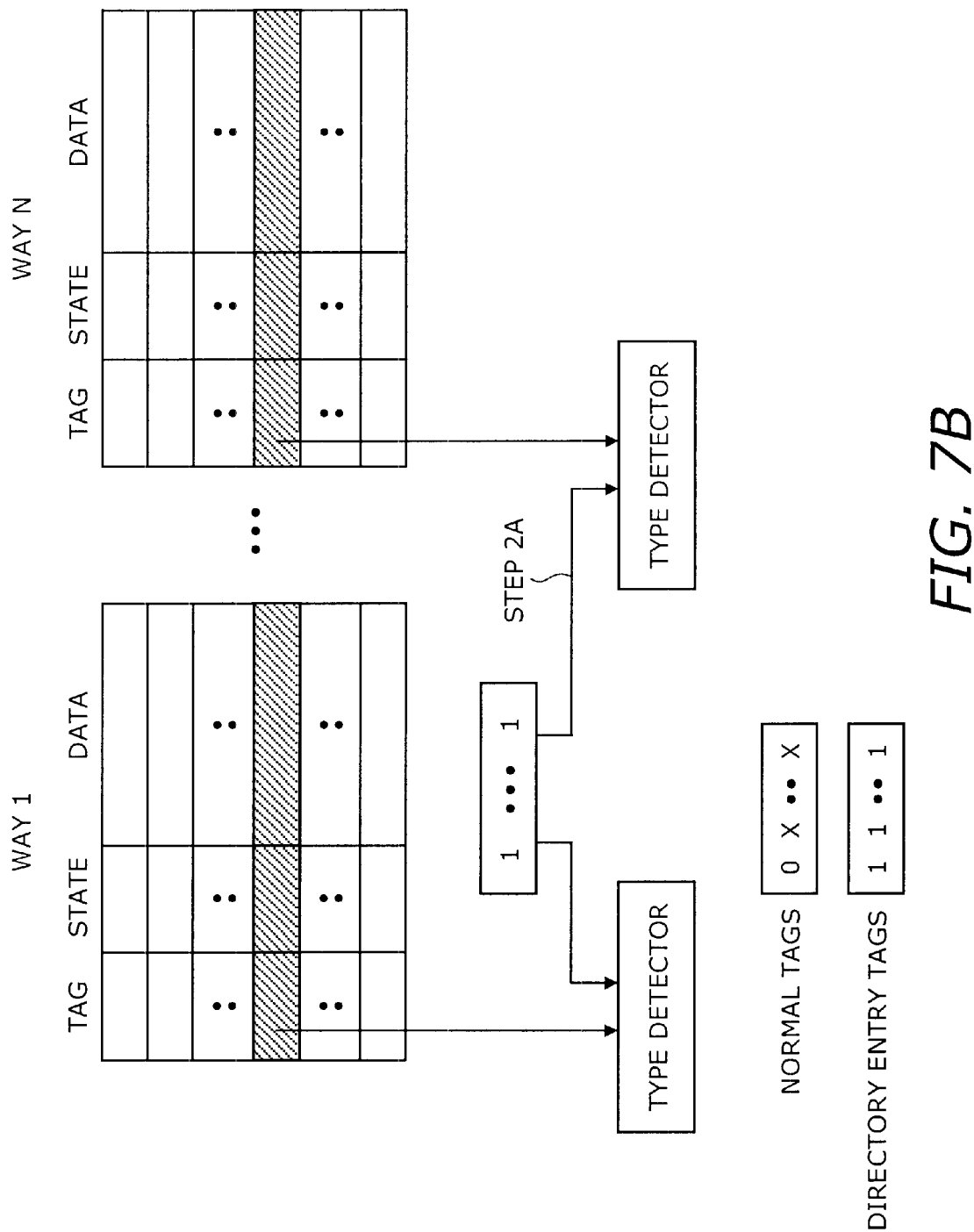
FIG. 7B is a diagram illustrating step 2 of a cache access for a sparse directory according to one embodiment of the invention.

The cache access can be further illustrated in FIGS. 7A through 7B. For illustrative purposes, not all elements are shown in FIGS. 7A through 7D. There are three basic steps in the directory access.

FIG. 7A is a diagram illustrating step 1 of a cache access according to one embodiment of the invention. The directory access involves the address and the N ways of the cache. For simplicity, only the tag, state, and data portions are shown.

The address includes a tag field, an index field, a home field, and a block field. The tag field contains the tag value to be matched with the tags read from the cache. The index field contains an index value to index the N ways of the cache. The home field contains the home identifier of the home node. The block field contains the block offset of the address from the block address.

In step 1, the index of the address is used to index the N ways of the cache. The entries of all the N ways corresponding to the index are retrieved from the cache. Within the N ways, there may be multiple sets.

FIG. 7B is a diagram illustrating step 2 of a cache access for a sparse directory according to one embodiment of the invention.

For sparse directory implementation, the directory entries are all located in the cache. To distinguish the directory entry from a normal entry, a special bit may be used. This bit is the entry type. In step 2, the tag field of the address is used to match the tags read from the retrieved entries. For the example shown in FIG. 7B, the most significant bit of the tag field is used to indicate the entry type: a zero is a normal entry and a one is a directory entry. In addition, the controller is free to utilize multiple sets by using two or more special tags (e.g., 11 . . . 1 and 11 . . . 0) for matching purposes. The tags are read from the indexed entries and are matched with the tag of the address. The type detector detects the type of the entry. If the entry is a normal type, the controller will process the cache normally. If the entry is a directory entry, the process will go to step 3 as shown in FIG. 7D.

Figure 7C:
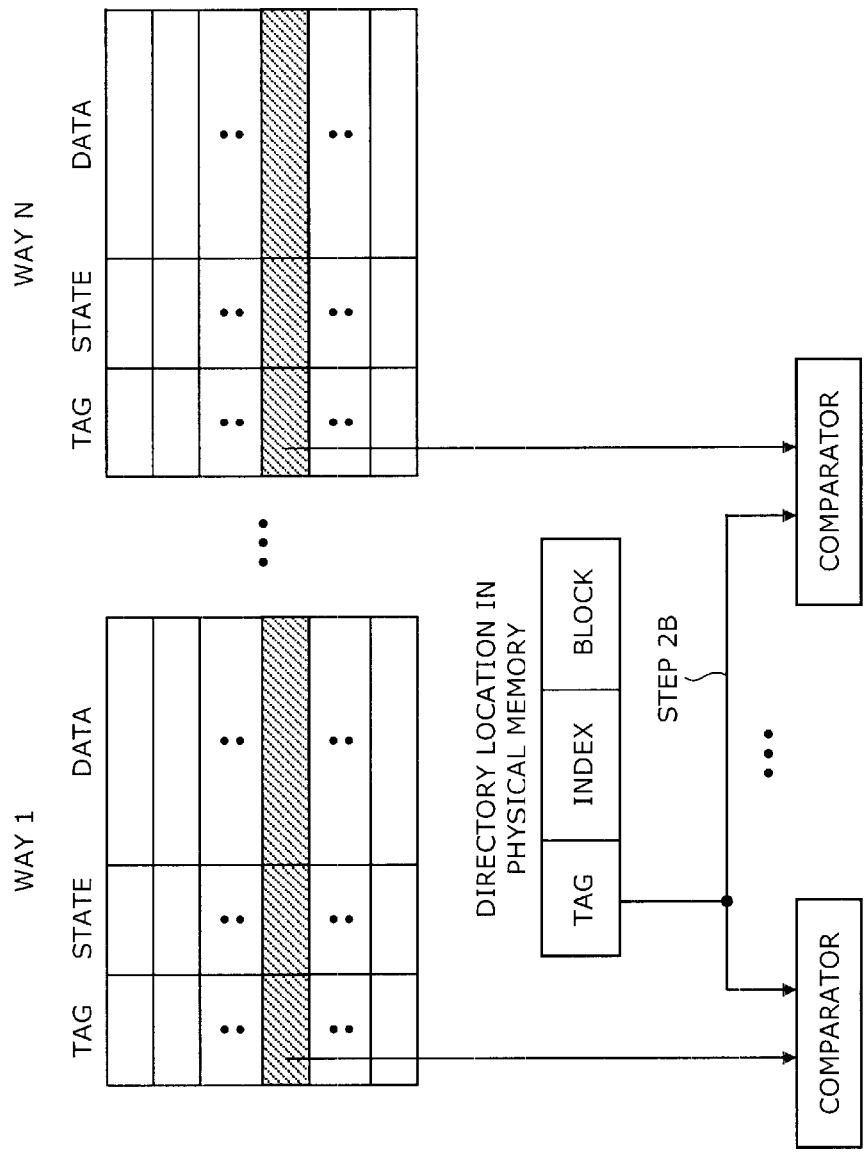
FIG. 7C is a diagram illustrating step 2 of a cache access using a full directory in physical memory according to one embodiment of the invention.

FIG. 7C is a diagram illustrating step 2 of a cache access using a full directory in physical memory according to one embodiment of the invention.

For full directory implementation, the physical memory is used to hold all the directory entries. It is also possible to store some directory entries in the cache and a larger amount in the physical memory. This implementation increases the size of the directory to cover all blocks in the physical memory without having to keep all the entries in the cache. As discussed before, this implementation allows simplification of directory protocol because cache eviction is not necessary. In step 2 for full directory, the directory is matched using the tag extracted from the directory location in physical memory to identify the correct set.

Figure 7D:
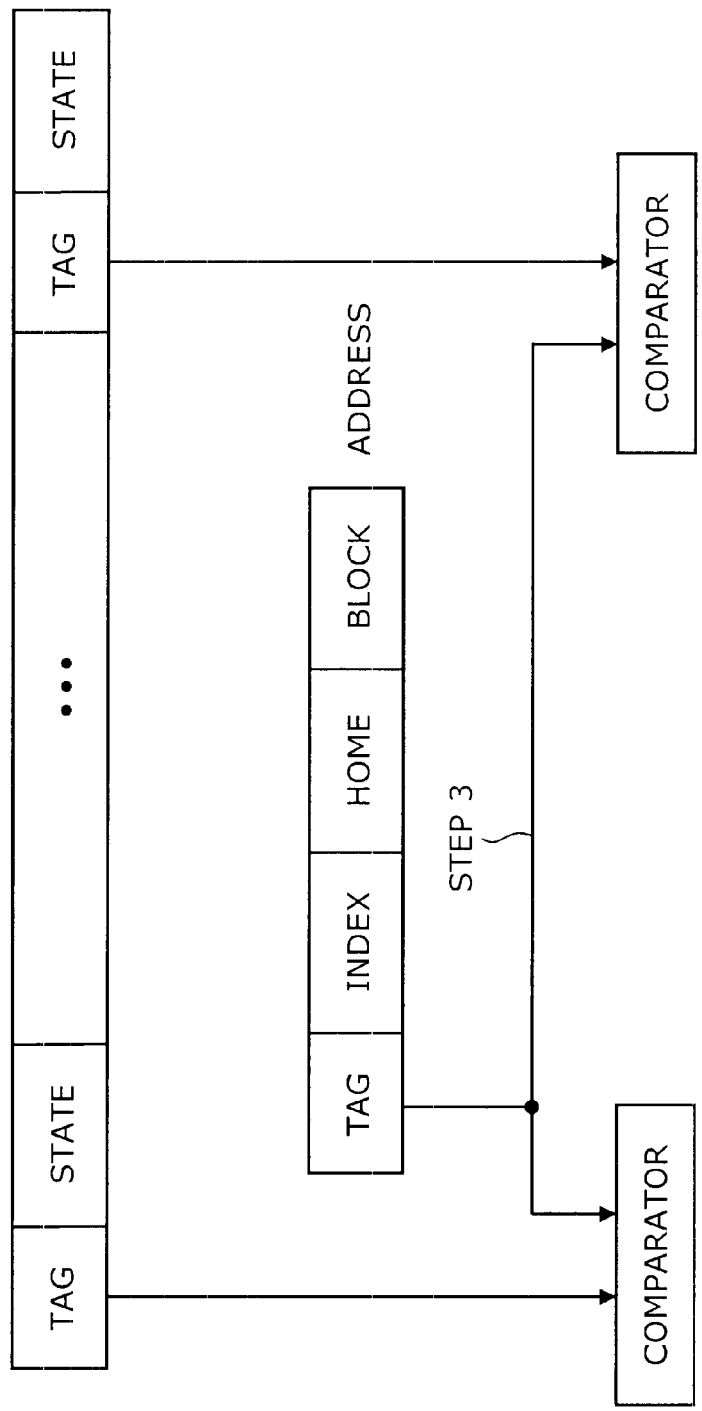
FIG. 7D is a diagram illustrating step 3 of a cache access according to one embodiment of the invention.

FIG. 7D is a diagram illustrating step 3 of a cache access according to one embodiment of the invention.

In step 3, the process selects the right directory entry among the entries stored in the data block. The tag of the address is compared with all the tags in the corresponding entries. For N tags, there are N comparators. If there is no match, a miss is declared. If there is a match, the matched directory entry is retrieved for subsequent processing.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
    a cache storing a plurality of entries, each of the plurality of entries containing an entry type indicating if the entry is one of a normal entry and a directory entry; and
    a controller coupled to the cache to process an access request for a memory block using the plurality of entries, the access request coming from a processor in a non uniform memory architecture (NUMA) system.

2. The apparatus of claim 1 wherein the normal entry contains normal cache data.

3. The apparatus of claim 1 wherein the directory entry contains a state of the memory block and an identifier identifying at least an owner node in the NUMA system having copy of the memory block.

4. The apparatus of claim 3 wherein the access request includes at least an access tag and an index.

5. The apparatus of claim 4 wherein the controller comprises:
    a cache controller coupled to the cache and a memory controller to control the cache; and
    a node controller coupled to the cache controller to process a node access relating to a remote node.

6. The apparatus of claim 5 wherein the cache controller comprises:
    a retrieving circuit to retrieves the entry based on the index;
    a type detector to detect the entry type;
    a tag matching circuit to match an entry tag with the access tag; and
    a node controller interface to provide directory information retrieved from the cache to the node controller.

7. The apparatus of claim 5 wherein the node controller comprises:
    a cache controller interface to provide the node access from the remote node to the cache controller;
    a directory tag matching circuit to match directory tags from the directory information received from the cache controller with the access tag;
    a directory allocator to allocate a directory entry in the cache; and
    a directory updater to update the directory entry in the cache.

8. The apparatus of claim 7 wherein the node controller further comprises:
    a remote node interface circuit to exchange remote information with the remote node;
    a block transfer circuit coupled to the memory controller to transfer a memory block from a memory to the cache if the access request results in a miss; and
    a node coherence logic circuit to maintain cache coherency according to a node coherence protocol.

9. The apparatus of claim 8 wherein the remote node interface circuit comprises:
    a request forwarder to forward the access request to the owner node having the memory block; and
    a data block receiver to receive the memory block sent from the owner node.

10. The apparatus of claim 7 wherein the node controller further comprises:
    a directory entry cache to store frequently accessed directory information.

11. A method comprising:
    storing a plurality of entries in a cache, each of the plurality of entries containing an entry type indicating if the entry is one of a normal entry and a directory entry; and
    processing an access request for a memory block using the plurality of entries by a controller, the access request coming from a processor in a non uniform memory architecture (NUMA) system.

12. The method of claim 11 wherein the normal entry contains normal cache data.

13. The method of claim 11 wherein the directory entry contains a state of the memory block and an identifier identifying at least an owner node in the NUMA system having copy of the memory block.

14. The method of claim 13 wherein the access request includes at least an access tag and an index.

15. The method of claim 14 wherein processing the access request comprises:
    controlling the cache by a cache controller coupled to a memory controller; and
    processing a node access relating to a remote node by a node controller.

16. The method of claim 15 wherein controlling the cache comprises:
    retrieving the entry based on the index;
    detecting the entry type;
    matching an entry tag with the access tag; and
    providing directory information retrieved from the cache to the node controller.

17. The method of claim 15 wherein processing the node access comprises:

providing the node access from the remote node to the cache controller;

matching directory tags from the directory information received from the cache controller with the access tag;

allocating a directory entry in the cache; and updating the directory entry in the cache.

18. The method of claim 17 wherein processing the node access further comprises:

exchanging remote information with the remote node;

transferring a memory block from a memory to the cache if the access request results in a miss; and maintaining cache coherency according to a node coherence protocol.

19. The method of claim 18 wherein exchanging remote information comprises:

forwarding the access request to the owner node having the memory block; and receiving the memory block sent from the owner node.

20. The method of claim 17 wherein processing the node access further comprises:

storing frequently accessed directory information in a directory entry cache.

21. A non-uniform memory architecture (NTJMA) system comprising:

an owner node having copy of a memory block; and a home node coupled to the requesting node and the owner node to process an access request for the memory block from a processor, the home node having a cache subsystem, the cache subsystem comprising:

a cache storing a plurality of entries, each of the plurality of entries containing an entry type indicating if the entry is one of a normal entry and a directory entry, and a controller coupled to the cache to process the access request for a memory block using the plurality of entries.

22. The system of claim 21 wherein the normal entry contains normal cache data.

23. The system of claim 21 wherein the directory entry contains a state of the memory block and an identifier identifying at least an owner node in the NUMA system having copy of the memory block.

24. The system of claim 23 wherein the access request includes at least an access tag and an index.

25. The system of claim 24 wherein the controller comprises:

a cache controller coupled to the cache and a memory controller to control the cache; and a node controller coupled to the cache controller to process a node access relating to a remote node.

26. The system of claim 25 wherein the cache controller comprises:

a retrieving circuit to retrieves the entry based on the index;

a type detector to detect the entry type;

a tag matching circuit to match an entry tag with the access tag; and a node controller interface to provide directory information retrieved from the cache to the node controller.

27. The system of claim 25 wherein the node controller comprises:

a cache controller interface to provide the node access from the remote node to the cache controller;

a directory tag matching circuit to match directory tags from the directory information received from the cache controller with the access tag;

a directory allocator to allocate a directory entry in the cache; and a directory updater to update the directory entry in the cache.

28. The system of claim 27 wherein the node controller further comprises:

a remote node interface circuit to exchange remote information with the remote node;

a block transfer circuit coupled to the memory controller to transfer a memory block from a memory to the cache if the access request results in a miss; and a node coherence logic circuit to maintain cache coherency according to a node coherence protocol.

29. The system of claim 27 wherein the node controller further comprises:

a directory entry cache to store frequently accessed directory information.

30. The system of claim 28 wherein the remote node interface circuit comprises:

a request forwarder to forward the access request to the owner node having the memory block; and a data block receiver to receive the memory block sent from the owner node.

* * * * *